(12) United States Patent
Mosse et al.

(10) Patent No.: US 9,179,293 B2
(45) Date of Patent: Nov. 3, 2015

(54) METHOD FOR UPDATING SECURE ELEMENTS INCLUDED IN TERMINALS OF A TELECOMMUNICATION NETWORK AND CORRESPONDING UPDATE SERVER

(75) Inventors: Franck Mosse, Berre l'Etang (FR); Lionel Mallet, Marseille (FR); Richard Pico, Luynes (FR)

(73) Assignee: GEMALTO SA, Meudon (FR)

( * ) Notice: Subject to any disclaimer, the term of this patent is extended or adjusted under 35 U.S.C. 154(b) by 79 days.

(21) Appl. No.: 14/007,745

(22) PCT Filed: Mar. 23, 2012

(86) PCT No.: PCT/EP2012/055182
§ 371 (c)(1),
(2), (4) Date: Oct. 4, 2013

(87) PCT Pub. No.: WO2012/130748
PCT Pub. Date: Oct. 4, 2012

(65) Prior Publication Data
US 2014/0080444 A1    Mar. 20, 2014

(30) Foreign Application Priority Data

Mar. 30, 2011  (EP) .................................. 11305358

(51) Int. Cl.
*H04W 8/18*  (2009.01)
*H04L 12/24*  (2006.01)
(Continued)

(52) U.S. Cl.
CPC .............. *H04W 8/18* (2013.01); *H04L 41/082* (2013.01); *H04L 41/0889* (2013.01); *H04L 67/125* (2013.01); *H04W 8/205* (2013.01); *H04W 12/00* (2013.01)

(58) Field of Classification Search
CPC ..... H04W 8/245; H04W 12/06; H04W 88/02; H04W 12/02; H04W 12/12; H04W 12/00; H04W 12/08; H04M 1/72525; H04L 67/04; H04L 63/0853; H04L 41/082; H04L 67/125; H04L 29/06; H04L 41/0889; G06Q 20/32

USPC .................................. 455/410, 558; 709/219
See application file for complete search history.

(56) References Cited

U.S. PATENT DOCUMENTS 6,580,909 B1 *   6/2003   Carro ......................... 455/435.1
2004/0088473 A1 *  5/2004   Ogle ............................. 711/100
(Continued)

FOREIGN PATENT DOCUMENTS

FR          2 892 837 A1    5/2007

OTHER PUBLICATIONS

International Search Report (PCT/ISA/210) mailed on Jul. 12, 2012, by the European Patent Office as the International Searching Authority for International Application No. PCT/EP2012/055182.
(Continued)

*Primary Examiner* — Allahyar Kasraian
*Assistant Examiner* — B. M. M Hannan
(74) *Attorney, Agent, or Firm* — Buchanan Ingersoll & Rooney PC

(57) ABSTRACT

The invention relates, in particular, to a method for updating secure elements included in terminals of a telecommunication network. The terminals connect, for recurring updates and according to a first order, to a server of the network such that said server can transmit data thereto. In the context of a process for updating the secure elements, the method comprises transmitting messages requesting connection to the secure elements such that the latter connect to the server. According to the invention, the method comprises the prioritized transmission of the messages requesting connection to the secure elements in an order that is the reverse of the first order, in order to update, on a prioritized basis, the last secure elements that were updated by the recurrent updates from the start of the update process.

7 Claims, 2 Drawing Sheets

(51) Int. Cl.
*H04W 8/20* (2009.01)
*H04L 29/08* (2006.01)
*H04W 12/00* (2009.01)

(56) References Cited

U.S. PATENT DOCUMENTS

2005/0101324 A1* 5/2005 Chambers et al. ......... 455/435.3
2007/0049269 A1* 3/2007 Ophir et al. ................ 455/432.1
2007/0294744 A1* 12/2007 Alessio et al. .................... 726/1
2008/0294752 A1 11/2008 Deschamps

OTHER PUBLICATIONS

Written Opinion (PCT/ISA/237) mailed on Jul. 12, 2012, by the European Patent Office as the International Searching Authority for International Application No. PCT/EP2012/055182.

* cited by examiner

METHOD FOR UPDATING SECURE ELEMENTS INCLUDED IN TERMINALS OF A TELECOMMUNICATION NETWORK AND CORRESPONDING UPDATE SERVER

The present invention relates to the field of telecommunications and more particularly relates to a method for updating secure elements included in the terminals of a telecommunication network, for instance of the cellular type. The terminals are, for instance, mobile terminals, such as portable phones, vehicles or PDAs.

From the application FR-2892837, it is known to download data into secure elements existing in a radio-communication network during a process. Downloading is carried out from an updating server connected to the telecommunication network.

The secure elements are chip cards, such as MMC (Multi-Media Card), SD (Secure Digital) or UICC (Universal Integrated Circuit Card) cards. The UICC chip card is for instance a card provided with a SIM (Subscriber Identity Module) application, when the terminal is a mobile phone of the GSM or GPRS types, or a USIM (Universal Subscriber Identity Module), a RUIM (Removable User Identity Module), or ISIM (IP Subscriber identity Module) application, associated with mobile terminals operating with a multiple access with CDMA (Coded Division Multiple Access) of the third generation (3GPP), of the UMTS (Universal Mobile Telecommunications System) or UTRAN (UMTS Terrestrial Radio Access Network) type, of the third generation (3GPP2) of the CDMA 2000 type or of the fourth generation (LTE).

The updating server, also called the active server or an OTA (Over the Air) card administration platform, includes software enabling the operator managing the radio-communication network to keep the control of the chip cards in the mobile terminals and to modify the contents thereof. Such operator-initiated operations (push mode) relate, for instance, to the downloading of a file into predetermined cards in the population managed by the operator, or the downloading or the erasing of a determined application, or the modification of data in a file or a determined application in cards managed by the operator.

In a conventional telecommunication network, recurring updates of the secure elements are planned, out of the massive update processes. Such recurring updates consist in programming the secure elements so that same connect to the updating server through the mobile terminals wherein they are integrated. A given secure element thus itself connects to the updating server, for instance regularly (every week, for instance). The updating server then downloads data into the secure element, if so required. The updating server may also inform the secure element when the secure element will have to connect to the server again.

In the existing IP networks, a secure element connects to the server according to the http protocol: it opens a secure link with the server and the server transmits the updating data using this link. In practice, the secure element makes an "open channel" on https and the server answers, if available. The server can simultaneously manage several thousands of secure connections in parallel in order to answer as many secure elements and carry out the updates thereof.

An updating server can thus manage a population of several millions, or even several hundreds of millions of secure elements over time.

One of the problems met with the existing updating servers is that triggering is sometimes necessary at the update processes active servers, when a fast update of the secure elements is required, i.e. without waiting for a recurring, i.e. automatic connection thereof to the server. Such quick updates may for instance consist in correcting a mistake ("patcher"), of the secure element operating system, or in replacing a bank applet by another one if a fault has been found in safety measures. Such updates cannot wait for the secure elements to connect to the server on their own initiative, and it is thus necessary to launch a secure element update process. Launching such a process conventionally consists in sending a message requesting connection to each secure element so that each secure element connects to the server. Such a process for instance consists in sending to a batch of a few thousands of secure elements a SMS or E-SMS message (i.e. a SMS message including a command), informing same that they must connect to the updating server. Once the connections are established, as mentioned above, the server transmits the updating data (patch of the operation system or replacement of an application by another one, for instance) to the secure elements connected to the server.

However, this solution has many drawbacks.

A first drawback of this solution is that the number of SMS or E-SMS to be transmitted is very large and results in the network being overloaded.

A second drawback is that the server contacts not only the secure elements which are actually active in the network, but also those which have been provided for in the HLR (Home Location Register) of the network operator. As a matter of fact, some of such secure elements may not be active, for instance not yet distributed to the final users thereof. An attempt is then made to address secure elements which are not in the field and thus will not be able to answer the prompting of the messages requesting connection.

A third drawback of this solution is that as many possibilities of opening https channels must be provided for as there are messages requesting connection, in addition to those required for the recurring updates. This may entail an overload of the server and thus require not too many secure elements to be simultaneously prompted, which results in a reduction in the number of updates of the secure elements by the process.

The present invention more particularly aims at remedying such drawbacks.

More precisely, one aim of the invention consists in providing a method for updating secure elements limiting the number of messages requesting connection transmitted by the server to such secure elements, in the case of an update process, with such method addressing only the secure elements actually active in the field and ensuring a balanced load of the server.

This aim, as well as other ones which will be mentioned in the following, is reached by a method for updating secure elements included in terminals of a telecommunication network, with said terminals connecting, for recurring updates and according to a first order, to a server of the network such that the server can transmit data thereto, with the method consisting, in the context of a process for updating said secure elements, in transmitting messages requesting connection to said secure elements such that the secure elements connect to the server, with the method consisting of the prioritized transmission of said messages requesting connection to the secure elements in an order that is the reverse of the first order, in order to update, on a prioritized basis, the last secure elements that were updated by said recurrent updates from the start of the update process.

Advantageously, the secure elements are SIM cards.

In another embodiment, the secure elements are ESE.

The terminals are preferably mobile phones.

The messages requesting connection are advantageously composed of ESMS.

The method according to the invention preferably consists in transmitting, from the server to the secure elements, a date of a future recurring update, during the update process.

The invention also relates to a server for updating secure elements included in the terminals of a telecommunication network, with the server comprising a flow controller connected to a data base of the secure elements updating dates, with the flow controller controlling the transmission of messages requesting connection to the secure elements according to the secure elements last updating date from the most recent updating date to the oldest updating date, from the start of an update process.

The invention will be best understood upon reading the following description of a preferred embodiment, which is given as an illustration and not a restriction and the appended drawings wherein:

FIG. 1 shows the progress of a secure elements update process. The figure includes three time scales 1A, 1B and 1C.

Scale 1A shows the condition of recurring updating of secure elements at a time DC corresponding to the start of an update process. In this example, it is considered that 20 million secured elements have been updated during an updating time having a duration T, starting from a time t0.

Scale 1B shows the progress of an update process according to the present invention. The batches of secure elements under the time axis are those for which recurring updates are executed, which means that no specific action has been performed at the update server (no sending of messages requesting connection from the server to the secure elements). The batches of secure elements above the time axis are those for which updates are executed within the context of the update process, which means that the server sends messages requesting connection to such secure elements.

Figure 1:
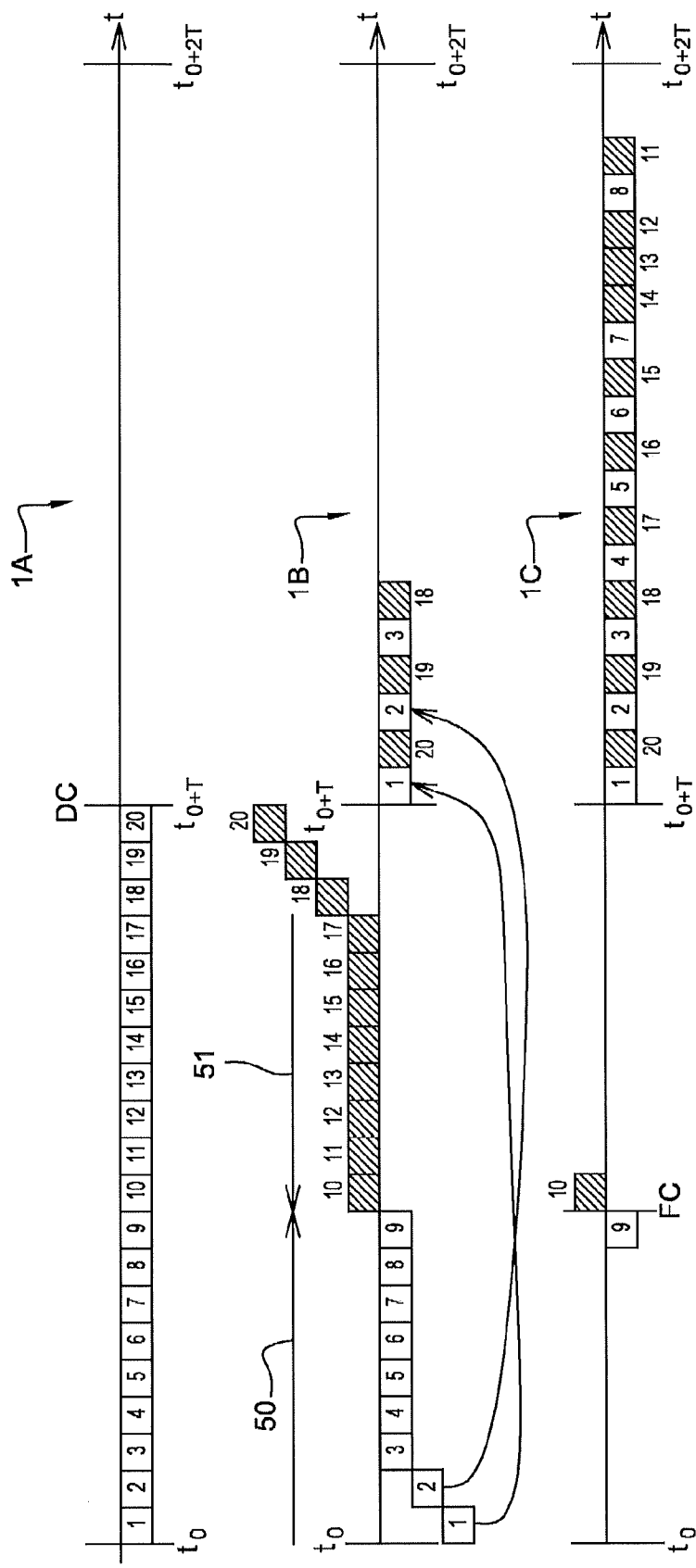
FIG. 1 shows the progress of a secure elements update process.

As shown in scale 1B, the secure elements concerned by the update process are first the last secure elements which were updated by the recurring updates, from the start DC of the update process. If a batch bearing reference 1 has been updated within the context of a recurring update, the batch 20 which is the last one having been updated within the context of such recurring update is thus the first one to be concerned by the process. Messages requesting connection are thus transmitted to the secure elements of the batch, from the server. Once connected to the server, data relative to the update process are transmitted thereto. Then a batch of secure elements 2 is automatically updated within the context of recurring updates. The update process then aims at a batch 19 of secure elements, and so on, until the end of the process shown in FIG. 1 and bearing reference FC.

It can be noted that, if batches of secure elements at the start of the process bore numbers 1 to 20, they are now chronologically referenced 1-20-2-19-3-18-4-17- ... -12-8-11 and that the process will probably end with batch 10 by a recurring update of batch 9.

It can be seen that, if the secure elements connect to the server in a first order (from 1 to 20), within the context of an update process, with such first order being symbolized by an arrow 50, such update process firstly addresses the messages requesting connection to the secure elements in an order that is the reverse of the first order. This results in the transmission of a limited number of requests for connection since only the batches 10 to 20 are concerned by the process, whereas the batches 1 to are updated within the context of the recurring update which requires no transmission of requests for connection.

In addition, as the batches 10 to 20 are batches having been recurrently updated beforehand (scale 1A), the messages requesting connection are transmitted to secure elements which actually are in the field, since they reported beforehand.

Finally, firstly addressing the secure elements which have just been recurrently updated makes it possible not to wait until the end of the recurring update time T (t0+2T) for the elements to be updated.

Figure 2:
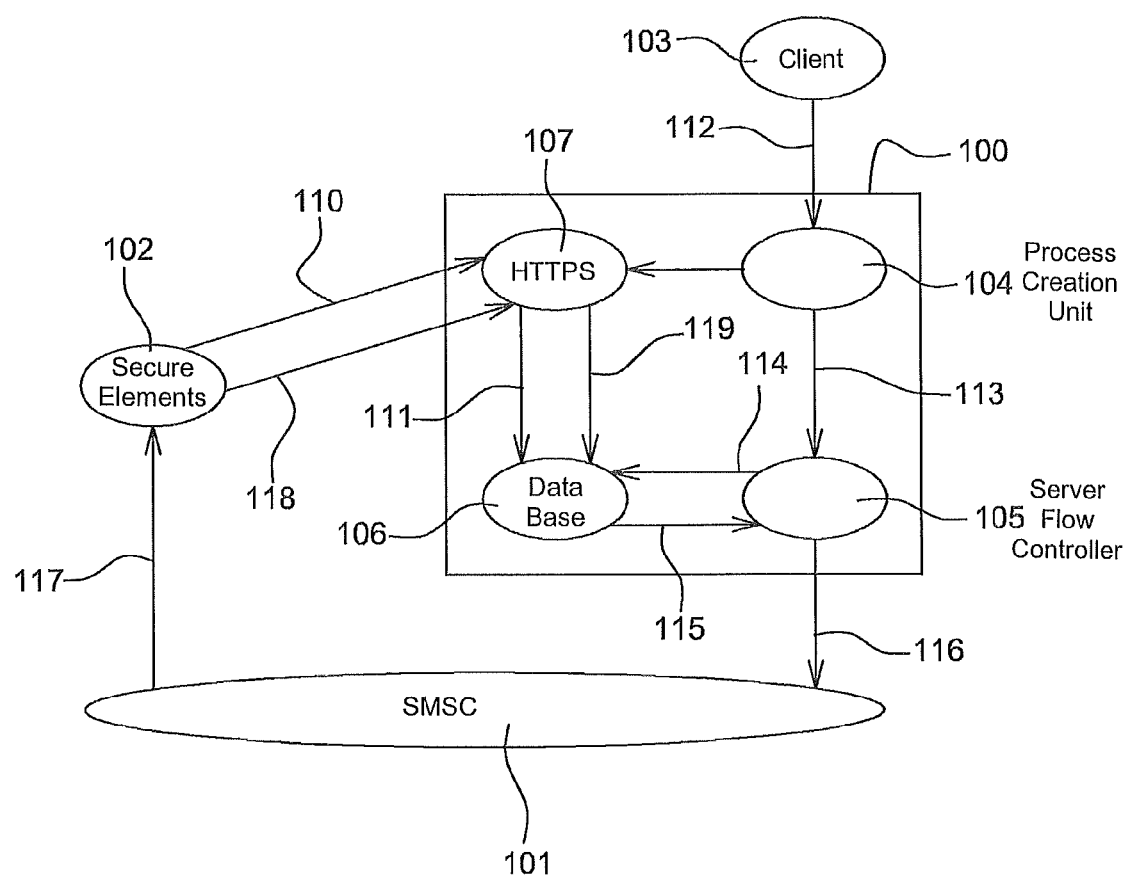
FIG. 2 shows a system including a server according to the present invention.

FIG. 2 shows a system including a server according to the present invention.

The system of FIG. 2 includes a server 100 for updating secure elements, with a part of a telecommunication network being composed of a short message service centre (SMSC) 101, as well as a population of secure elements 102 included in mobile or fixed terminals, which can be administered by the server 100. The system also comprises a user 104 able to connect to the server 100 to command an update process on the secure elements 102.

The server 100 comprises a process creation unit 104, a server flow controller 105, a data base 106 containing the history of the secure elements 102 updates, as well as an https module 107. The https module 107 contains an Internet application, the execution of which is performed in a secure mode. This may be, for instance, a war module deployed in an application server.

According to the invention, two processes are executed in parallel: a recurring update (for instance at each time T) of the secure elements 102 and an update of such secure elements by a process (for instance a process considered as urgent, which cannot wait for the end of a time T to update the secure elements 102).

The recurring update of the secure elements 102 firstly consists in programming the secure elements 102, during an initialisation phase, so that same regularly connect to the server 100. The secure elements cooperate with supplied terminals comprising clocks. The secure elements 102 regularly consult the clocks of the terminals which they are connected to and, when the time when they are requested to connect to the server 100 comes, they send the https module 107 a request 110 for opening a secure channel. Such request 110 consists, for instance in the case of an IP network (for example of the LTE type), in transmitting an "open channel" command to the https module 107. An http server of the Apache type may be used as an intermediate between the secure elements 102 and the https module 107 to secure the communication channel. Once this channel is established, the https module 107 executes the updating of the secure elements 102 (not shown) and stores the latest update of the secure elements 102 which have connected into the data base 106, during a step 111.

The update of the secure elements 102 by a process is decided by the client 103. The client 103 is for instance a TSM (Trusted Party Manager) or an entity authorized to decide that an urgent update of the secure elements 102 is necessary.

For this purpose, the client 103 transmits a command 112 to the process creation unit 104, with the elements required for this process to be carried out (patch of the system operating the secure elements 102, new programs to be installed in the secure elements 102, scenario of the tasks to be performed, ... ).

The process creation unit 104 then sends a request for transmission 113 of a message requesting connection to the flow controller 105, for instance of the "send a trig. SMS to the secure elements 102" type.

Upon reception of such command, the flow controller 105 polls, during a step 114, the data base 106, to request it to supply, during a step 115, the history of the updates of the secure elements 102. From this history, and more precisely from the dates of the latest updates, the flow controller 105 which knows the maximum number of simultaneous connections which can be accepted by the server 100, transmits, during a step 116, messages requesting connection ("trig SMS") to the SMSC 101. The number of messages transmitted to the SMSC 101 takes account of the load of the server 100 resulting from the recurring updates. The SMSC 101 then transmits commands (SMS or E-SMS) for opening http channels (for instance of the "open channel" type) to the secure elements 102, during a step 117. The secure elements contacted then open communication channels with the https module 107 (step 118) which executes the update thereof with the required elements stored in the process creation unit 104 and transmits the dates of the updates (step 119) to the data base 106.

The updated secure elements are typically SIM or UICC cards. It is also possible to integrate SIM functionalities into elements integral with the terminals they are accommodated in. They are called ESE (Embedded Secure Element) then.

The invention also applies to the M2M communications where the secure elements are included in machines such as vehicles, automatic dispensers or cameras.

The invention claimed is:

1. A method for updating secure elements included in terminals of a telecommunication network, with said terminals connecting, for recurring updates and according to a first order, to a server of said telecommunication network such that said server transmits data thereto, the method comprising:

in parallel with a recurring update of said secure elements according to the first order, transmitting, by said server, to said secure elements, messages requesting connection to said secure elements such that the secure elements connect to the server, wherein said server transmits said messages in a prioritized manner such that the messages request connection to the secure elements in an order that is a reverse of the first order, in order to update in parallel with said recurring update according to the first order, on a prioritized basis, the secure elements that are last in the recurring updates from the start of the update process.

2. A method according to claim 1, wherein said secure elements are Subscriber Identity Module (SIM) cards.

3. A method according to claim 1, wherein said secure elements are Embedded Secure Elements (ESE).

4. A method according to claim 1, wherein said terminals are mobile phones.

5. A method according to claim 1, wherein said messages requesting connection are electronic Short Message Services (ESMS).

6. A method according to claim 1, further comprising transmitting, from said server to said secure elements, a date of a future recurring update, during said update process.

7. A server for updating secure elements included in the terminals of a telecommunication network, said server comprising:

a database of update dates for said secure elements; and a flow controller connected to said database of said secure elements updating dates, said flow controller configured to command, in parallel with a recurring update of said secure elements, transmission of messages requesting connection to said secure elements, wherein said messages are transmitted to said secure elements, according to the last update process of the secure elements, from the most recent updating date of the secure elements to the oldest updating date of the secure elements, in order to update in parallel with a recurring update, on a prioritized basis, the secure elements that are last in the recurring update from the start of the update process.

* * * * *